US012693448B2

(12) United States Patent
Shi et al.

(10) Patent No.: US 12,693,448 B2
(45) Date of Patent: Jul. 28, 2026

(54) GRIDLESS VOLUMETRIC COMPUTATION

(71) Applicant: Landmark Graphics Corporation, Houston, TX (US)

(72) Inventors: Genbao Shi, Houston, TX (US); Raquel Medina, Houston, TX (US); Sebastien Bruno Strebelle, Paris (FR)

(73) Assignee: Landmark Graphics Corporation, Houston, TX (US)

( * ) Notice: Subject to any disclaimer, the term of this patent is extended or adjusted under 35 U.S.C. 154(b) by 898 days.

(21) Appl. No.: 18/079,655

(22) Filed: Dec. 12, 2022

(65) Prior Publication Data

US 2024/0192400 A1 Jun. 13, 2024

(51) Int. Cl.
*G01V 20/00* (2024.01)
*E21B 49/00* (2006.01)

(52) U.S. Cl.
CPC .............. *G01V 20/00* (2024.01); *E21B 49/00* (2013.01); *E21B 2200/20* (2020.05)

(58) Field of Classification Search
CPC ...... G01V 20/00; E21B 49/00; E21B 2200/20
USPC ......................................................... 703/10
See application file for complete search history.

(56) References Cited

U.S. PATENT DOCUMENTS

| | | | |
|---|---|---|---|
| 7,075,558 B2 | 7/2006 | Watanabe et al. | |
| 7,783,462 B2 * | 8/2010 | Landis, Jr. ............. | G01V 1/301 |
| | | | 703/10 |
| 8,587,617 B2 | 11/2013 | Hoff et al. | |

| | | | |
|---|---|---|---|
| 10,795,053 B2 | 10/2020 | Dulac | |
| 11,481,998 B2 | 10/2022 | Lin et al. | |
| 2006/0136162 A1 | 6/2006 | Hamman et al. | |
| 2006/0277012 A1 | 12/2006 | Ricard et al. | |
| 2007/0061117 A1 * | 3/2007 | Landis ................... | E21B 49/00 |
| | | | 703/10 |
| 2011/0054857 A1 | 3/2011 | Moguchaya | |
| 2011/0131015 A1 | 6/2011 | Yarus et al. | |
| 2011/0205844 A1 | 8/2011 | Maucec et al. | |
| 2011/0264430 A1 | 10/2011 | Tapscott et al. | |
| 2012/0035896 A1 | 2/2012 | Wu et al. | |
| 2013/0018642 A1 | 1/2013 | Mifflin et al. | |
| 2013/0332125 A1 | 12/2013 | Suter et al. | |

(Continued)

FOREIGN PATENT DOCUMENTS

| | | |
|---|---|---|
| WO | 2014182331 | 11/2014 |
| WO | 2017213631 | 12/2017 |
| WO | 2018045255 | 3/2018 |

OTHER PUBLICATIONS

"PCT Application Serial No. PCT/US2018/066899, International Search Report and Written Opinion", Sep. 18, 2019, 9 pages.

(Continued)

*Primary Examiner* — Justin C Mikowski

(74) *Attorney, Agent, or Firm* — DeLizio, Peacock, Lewin & Guerra LLP

(57) ABSTRACT

In some embodiments, a method for computing, by a volume data processor, volumetrics of a subsurface region without gridlines associated with the subsurface region comprises creating, in the volume data processor, a geometry representing the subsurface region and first bounding box about the geometry, computing a first probability that a group of sampled points inside the first bounding box are inside the geometry, and computing a gross rock volume (GRV) of the geometry by multiplying the first probability by a volume of the first bounding box.

20 Claims, 5 Drawing Sheets

(56) References Cited

U.S. PATENT DOCUMENTS

| | | | |
|---|---|---|---|
| 2013/0339891 A1 | 12/2013 | Blumenberg et al. | |
| 2015/0253460 A1* | 9/2015 | Ewing | G06T 17/05 |
| | | | 703/10 |
| 2016/0090825 A1* | 3/2016 | Imhof | G01V 20/00 |
| | | | 703/10 |
| 2016/0168959 A1 | 6/2016 | Yarus et al. | |
| 2017/0248718 A1* | 8/2017 | Thore | G01V 1/305 |
| 2017/0275970 A1 | 9/2017 | Crawford et al. | |
| 2017/0315249 A1 | 11/2017 | Myers et al. | |
| 2019/0265386 A1 | 8/2019 | Malvesin et al. | |
| 2020/0160173 A1 | 5/2020 | Pandey et al. | |
| 2021/0225071 A1 | 7/2021 | Yarus et al. | |
| 2021/0333433 A1 | 10/2021 | Yarus et al. | |

OTHER PUBLICATIONS

"U.S. Appl. No. 16/753,945 Final Office Action", Oct. 15, 2021, 21 pages.

"U.S. Appl. No. 16/753,945 Office Action", May 2, 2022, 14 pages.

"U.S. Appl. No. 16/753,945 Office Action", Dec. 6, 2022, 12 pages.

"U.S. Appl. No. 16/753,945 Office Action", Feb. 1, 2022, 12 pages.

"U.S. Appl. No. 16/753,945 Office Action", Jul. 13, 2021, 23 pages.

"U.S. Appl. No. 16/753,945 Office Action", Jul. 29, 2022, 12 pages.

Jones, et al., "Integration of regional to outcrop digital data: 3D visualisation of multi-scale geological models.", Computers & Geosciences 35.1 (2009): 4-18, Jan. 1, 2009.

Oliaei, et al., "A coupled hydro-mechanical analysis for prediction of hydraulic fracture propagation in saturated porous media using EFG mesh-less method", Computers and Geotechnics; pp. 254-266 (Year: 2013), Jan. 1, 2014.

Ringrose, et al., "Multiscale geological reservoir modelling in practice.", Geological Society, London, Special Publications 309.1 (2008): 123-134, Jan. 1, 2008, 14 pages.

Srivastava, et al., "Grid-less Simulation of a Fluvio-Deltaic Environment", May 2013; CSPG/CSEG/CWLS GeoConvention; (Year: 2013), May 1, 2013, 18 pages.

Tahmasebi, et al., "Accelerating pattern-based geostatistical simulation of categorical variables using a multi-scale search in Fourier space", Mar. 19, 2014; Computers & Geosciences 67; pp. 75-88 (Year: 2014), Mar. 19, 2014.

Xiong, et al., "A 3D multi-scale geology modeling method for tunnel engineering risk assessment.", Tunnelling and Underground Space Technology 73 (2018): 71-81., Mar. 1, 2018, 20 pages.

Pagayevskiy, et al., "Multivariate grid-free geostatistical simulation with point or block scale secondary data", Sep. 19, 2015; Springer-Verlag (Year: 2015), Sep. 19, 2015.

"PCT Application No. PCT/US2022/081479, International Search Report and Written Opinion", Aug. 25, 2023, 9 pages.

* cited by examiner

201

Processor
Unit

Bus

205

Network
Interface

207

Memory

Volume Data Processor ⌇ 211

⌇ 203

GRIDLESS VOLUMETRIC COMPUTATION

TECHNICAL FIELD

The disclosure generally relates to the field of assessing subsurface regions and, more specifically, determinations of subsurface region properties via statistical analysis.

BACKGROUND

Oil and Gas companies require estimating the volume of their subsurface resources for multiple reasons. They may use the oil and gas volumes to design development plans, to rank projects and allocate capital expenditures, acquire and divest assets, to comply with regulations, assess their uncertainty and mitigate risk, and more. For many years, the estimation of the subsurface volumes has used 3D geocellular models to create a digital representation of the subsurface assets. These models comprise a series of subvolumes, called cells, where geoscientists may allocate petrophysical property values using different interpolation, simulation or computation techniques. Each cell has a finite volume, and the overall hydrocarbon volume is the summation of all the cell volumes occupied by hydrocarbons. The grid is built with a defined size, but number of cells and the volumes may vary, sometimes quite largely, based on the grid resolution. Because it may take a long time to compute each cell to allocate a property value and compute the volume, geoscientists reduce the resolution of their models at the expense of accuracy in their estimations which may often compromise their understanding of the subsurface.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to estimating subsurface region volumetrics without a grid in illustrative examples. Embodiments of this disclosure may be instead applied to reservoir evaluation to determine an estimated ultimate recovery (EUR) of the reservoir. In other instances, well-known instruction instances, protocols, structures, and techniques have not been shown in detail in order not to obfuscate the description.

Overview

Volumetrics such as Pore Volume (PV) or Original Oil in Place (OOIP) in a subsurface region (such as a reservoir) are traditionally estimated using a stratigraphic grid representing that subsurface region. The traditional approach estimates the subsurface region volume as a cumulative sum of all the cell volumes, which requires looping through each cell of the grid. If the grid has a low resolution (large cell size, small number of cells), the representation loses accuracy, especially around faults, and the computed volumetrics may be far off the true ones. If the grid has a high resolution (small cell size, large number of cells), the computation may take a very long time. A 100 million cell grid is quite usual and capturing the uncertainty of the volumetrics estimation through multiple grids may take days. Therefore, a novel approach for estimating the volumetrics of a subsurface region independently from any grid is disclosed herein. The approach is based on the Mean Value Theorem for Integrals with a precision based on the Central Limit Theorem. Monte Carlo simulation or similar techniques may be applied to compute an estimate Gross Rock Volume (GRV) for any region within the subsurface region, and the GRV estimate, when applied with the Mean Value Theorem, may be used to estimate PV and other volumetric measures without necessitating a grid. Some implementations may compute the volumetrics with specified precision. This method may reduce the time needed for volumetric estimations from hours or days to minutes without any loss of precision.

Example Illustrations

Figure 1:
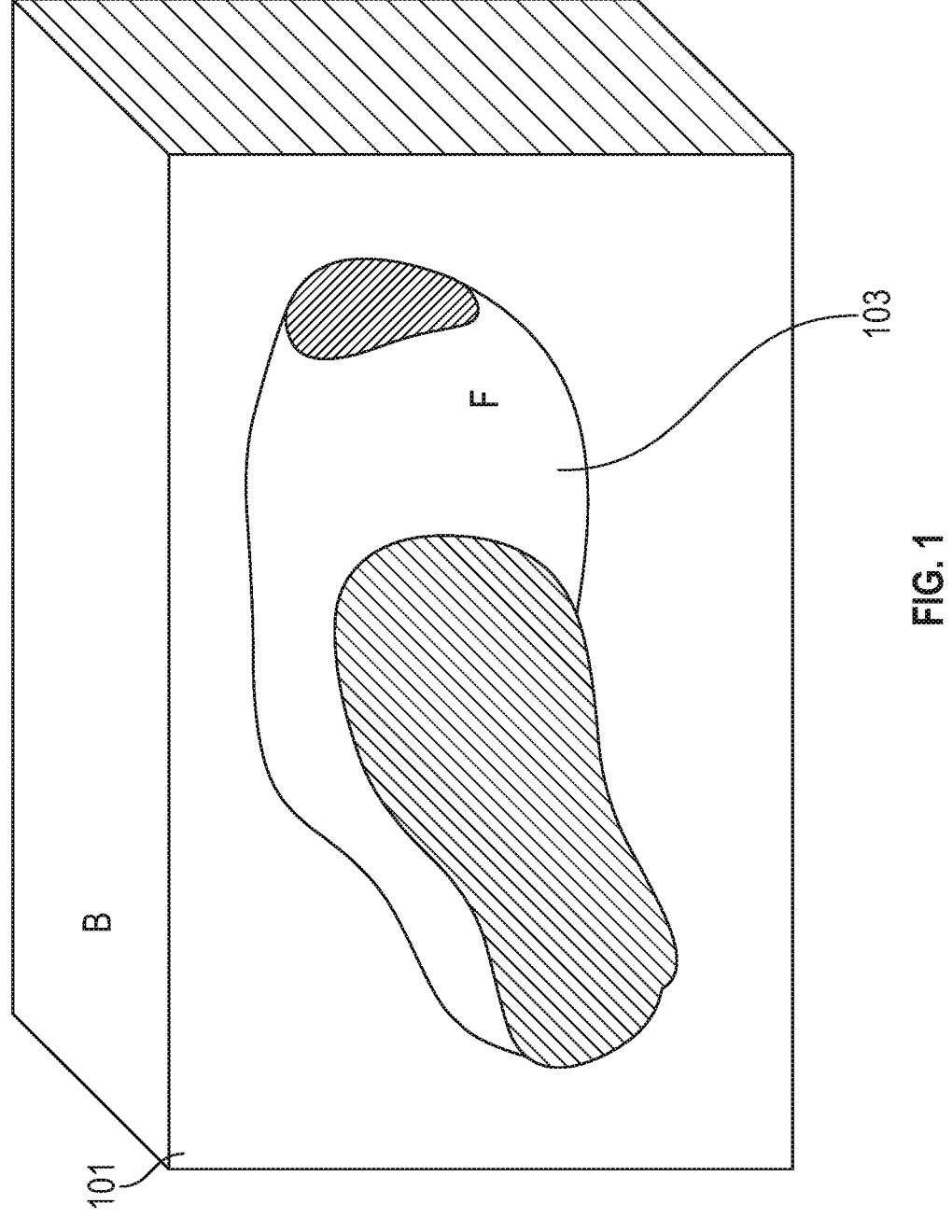
FIG. 1 depicts an example bounding box comprising a subsurface region, according to some embodiments.

FIG. 1 depicts an example bounding box comprising a subsurface region, according to some embodiments. A bounding box 101, also depicted as Box "B", represents a volume comprising a subsurface region 103. The bounding box 101 may be depicted as a cuboid, rectangular prism, or any suitable three-dimensional geometry for which a known mathematical formula directly provides the exact volume computation (e.g., a parallelepiped). The subsurface region 103, also depicted as subsurface region framework "F", may comprise an irregular shape having a volume which may not be as readily determined. In some embodiments, the subsurface region 103 may represent a basin, a field, a fault block, a borehole, or any other portion of the Earth's subsurface at any scale. The volume of the bounding box 101 may be computed as a product of the length, width, and height of box B. The volume of the subsurface region 103 may be determined statistically. To estimate the volume of the subsurface region 103 enclosed by a geometry F, let X be a random point inside B, and defined as:

$$X = \begin{cases} 1 & \text{if } X \text{ is inside } F, \\ 0 & \text{otherwise.} \end{cases} \qquad \text{Eq. (1)}$$

X is an indicator random variable which may be sampled at random points within the bounding box "B". In some embodiments, the sampling may be regular, random, or pseudo-random. X may follow a Bernoulli distribution comprising mean "p", which is the probability of a random point X residing within the subsurface region F. The probability, p, may also represent the ratio of the volume of F to the volume of B. Therefore, estimating the volume of the subsurface region F is equivalent to estimating the probability p since the volume of B is known. In some embodiments, the probability p may be estimated through Monte Carlo simulation by randomly sampling n random points inside of box B as $X_1, X_2, \ldots X_n$, although other simulation methodologies may be used. Equation 2 depicts this estimation of the probability, p:

$$\hat{p} = \frac{X_1 + X_2 + \dots + X_n}{n} \qquad \text{Eq. (2)}$$

$$= \frac{\text{number of sampled points inside } F}{\text{total number of sampled points } n} \qquad \text{Eq. (3)}$$

The volume of the subsurface region F may further be estimated as the product of the estimated probability, $\hat{p}$, multiplied by the volume of Box "B":

$$|\hat{F}| = \hat{p} * |B| = \frac{\text{number of sampled points inside } F}{\text{total number of sampled points } n} * |B| \qquad \text{Eq. (4)}$$

The above equation provides a stochastic approach to estimate a gross rock volume (GRV) of the subsurface region F (subsurface region 103). The GRV represents the total volume of rock enclosed by the subsurface region 103, not accounting for pores or fluids within the rock itself. Therefore, to estimate the GRV of a subsurface region, one may find its bounding box B containing the subsurface region F, randomly sample n points inside B, count the number of sampled points inside of subsurface region F, and plug those numbers into the above Equation 4. The computation is straightforward and does not require the creation of any stratigraphic grids representing the subsurface region. This process may apply not only to the GRV of the subsurface region 103 but also to any sub-regions such as stratigraphic intervals, formations, or fault blocks inside the subsurface region 103. To estimate the volume $|\hat{A}|$ of a geometry A representing a subregion inside of the subsurface region F, a bounding box B may be created around A, and n random points may be sampled inside box B as $X_1, X_2, \dots X_n$. Similar to calculating the estimated volume of subsurface region F, the volume of region A may be approximated with Equations 5 and 6 below:

$$|\hat{A}| = \frac{X_1 + X_2 + \dots + X_n}{n} * |B| \qquad \text{Eq. (5)}$$

$$= \frac{\text{number of sampled points inside } A}{\text{total number of sampled points } n} * |B| \qquad \text{Eq. (6)}$$

In some embodiments, a precision of the probability estimate, $\hat{p}$, may be estimated using the Central Limit Theorem. A confidence interval with a confidence $1-\sigma$ of the estimation of $\hat{p}$ may be determined with Equation 7, depicted below:

$$\left[ \hat{p} - Z_{\frac{\alpha}{2}} \sqrt{\frac{\hat{p} * (1 - \hat{p})}{n}}, \hat{p} + Z_{\frac{\alpha}{2}} \sqrt{\frac{\hat{p} * (1 - \hat{p})}{n}} \right] \qquad \text{Eq. (7)}$$

where $\hat{p}$ is the estimated probability of any randomly sampled point residing with region A, alpha ($\alpha$) is a significance level, Z is a Z-score, and n represents the total number of sampled points. By substituting values of p, the following equation may be utilized to determine the confidence $1-\alpha$:

$$\frac{\left\| |\hat{A}| - |A| \right\|}{|A|} = \frac{\left| \hat{p} * |B| - p * |B| \right|}{p * |B|} = \frac{|\hat{p} - p|}{p} \leq \frac{Z_{\frac{\alpha}{2}} \sqrt{\frac{\hat{p} * (1 - \hat{p})}{n}}}{p} \qquad \text{Eq. (8)}$$

Therefore, if the estimation of $\hat{p}$ is desired to achieve at least a r % precision with the confidence $1-\alpha$, a sample size may be made large enough such that:

$$Z_{\frac{\alpha}{2}} \sqrt{\frac{\hat{p} * (1 - \hat{p})}{n}} / p \leq r\% \qquad \text{Eq. (9)}$$

$$n \geq \hat{p} * (1 - \hat{p}) * \left( \frac{Z_{\frac{\alpha}{2}}}{p * r\%} \right)^2 \qquad \text{Eq. (10)}$$

For example, p=0.5, to achieve 0.1% precision of the estimated GRV with 0.95 confidence level, a sample size of at least 4 million random points inside B may be needed. In some embodiments, the precision of the GRV may comprise a range, and the precision range may either be a relative precision (e.g., plus or minus 1% of the actual volume), or an absolute precision (e.g., plus or minus 1,000 cubic meters).

$$n \geq 0.5 * (1 - 0.5) * \left( \frac{1.96}{0.5 * 0.1\%} \right)^2 \approx 4 * 10^6 \qquad \text{Eq. (11)}$$

In some embodiments, the total number "n" of sampled points within box B may be used to verify the validity of the sample size used to estimate the GRV. In other words, the above equation may be used to determine a quantity of points in the group of sampled points (n) that may satisfy a desired precision based partly on a selected confidence level and the estimated probability, $\hat{p}$. The above approach using the Central Limit Theorem may be combined with the Mean Value Theorem for Integrals. The Mean Value Theorem states that for a continuous and differentiable function over a closed interval, there exists at least at least one point within the interval along the curve comprising a tangent line parallel to the secant of the interval bounds—i.e., the at least one point is equal to the mean value of the function within the interval. The combined approach utilizing the Central Limit Theorem and Mean Value Theorem may allow for computing a pore volume (PV), OOIP, or other volumetric quantities for the entire subsurface region F or any sub-region(s) A without necessitating a grid approach.

Current industry methods may make use of a grid to calculate subsurface region volumetrics. For example, traditional computations of PV (pore volume) may require a stratigraphic grid. Let G be a stratigraphic grid created from subsurface region F (also referred to as geometry F), and let $v_i$ be the volume of the i-th cell of G, i=1, 2, . . . , n. Let $por_i$ be the porosity value within $v_i$. Equation 12 depicts this relationship below:

$$PV = \sum_{i=1}^{n} por_i * |v_i| \qquad \text{Eq. (12)}$$

where the porosity of each cell is multiplied by the volume of each cell, and the products of each cell are summed across the total number of cells n within the grid, G.

Current industry methods may also partition each cell i into a plurality of sub-cells i,j, j=1, 2, . . . , m whereby the volume $|v_{i,j}|$ of each sub-cell i,j goes to very small values (e.g., volume corresponding to the well log resolution). Thus, the above Equation 12 may be expanded to Equation 13 below:

$$PV = \sum_{i=1}^{n} por_i * \sum_{j=1}^{m} |v_{i,j}| = \sum_{i=1}^{n} \sum_{j=1}^{m} por_i * |v_{i,j}| \qquad \text{Eq. (13)}$$

where the pore volume now comprises a summation of sub-cells.

Each cell, i, of the grid G is typically represented by a cube, and the sub-cells, j, are usually smaller cubes within each cell. The sum of the products across all cells may equal to a pore volume of the subsurface region, which, without the grid, G, may equally be represented as a volume integral of a porosity function. Equation 13 is again depicted below as part of a proof relating the pore volume to F:

$$PV = \sum_{i=1}^{n} por_i * \sum_{j=1}^{m} |v_{i,j}| = \sum_{i=1}^{n} \sum_{j=1}^{m} por_i * |v_{i,j}|$$

$$\rightarrow \int \int \int_{G} por \; dv \; \text{by the definition of integral}$$

$$= \overline{por} * |G| \; \text{by Mean Value Theorem for Integral}$$

$$\approx \overline{por} * |F| \; \text{since } G \text{ is a "rough" partition of the field}$$

In the above mathematical proof, por is a function defined by $por(x) = por_i$, if x is in cell $v_i$, for any point x in G, $\overline{por}$ is the average of the function por inside of grid G, and |F| is the volume inside subsurface region F. According to the Mean Value Theorem, there exists an average porosity value along the function por which may be integrated over the entire stratigraphic grid, G. Since the grid is a rough partition of the GRV of the subsurface region, |G| may be substituted with the calculated value of |F|. The last statement in the above formula set does not involve grid G anymore. Therefore, the pore volume (or similar volumetrics) may be calculated without the creation of a stratigraphic grid.

The above reasoning may also apply to any subregion A inside the subsurface region. In general, for any region A, let por be the porosity distribution in A, and its pore-volume PV may be estimated as:

$$PV = \overline{por} * |A| \approx \overline{por} * |\hat{A}| = \qquad \text{Eq. (14)}$$
$$\overline{por} * \frac{\text{number of sampled points in } A}{\text{total number of sampled points } n} * |B|$$

The porosity function por may be determined through a Turning Band Simulation, Sequential Gaussian Simulation, or any suitable algorithm to estimate a porosity distribution inside region A at the sampled n locations. In some embodiments, the sampling used to estimate property averages (such as the average porosity, $\overline{por}$) may comprise regular sampling, random sampling, or pseudo-random sampling. In other embodiments, the sampling may comprise sampling well log data, seismic data, etc.

Other volumetric calculations, such as a value of OOIP within region A, may also be calculated. For example, the OOIP of region A may be determined by Equation 15 below:

where net is a net-to-gross function describing the fraction of the subsurface region occupied by hydrocarbons, por is the porosity function, and sw is the water saturation function in A. $\overline{net*por*(1-sw)}$ is the average of the product of those functions in A. Therefore, in order to estimate OOIP inside a region A, one may only estimate the average $\overline{net*por*(1-sw)}$ and the volume of A, which may be achieved through Monte Carlo Simulation or similar methods. In some embodiments, the difference of 1−sw may be considered a hydrocarbon saturation. In some embodiments, the estimated average of the combination of multiple properties (such as $\overline{net*por*(1-sw)}$) may also be estimated via regular, random, or pseudo-random sampling. In some embodiments, a precision range may be provided to determine a quantity of sampled points that will satisfy a desired precision and confidence level.

Numerous other volumetric quantities and/or features may be calculated using the grid-less approach. For example, one may compute a Net Pore Volume (NPV) of a subregion A of subsurface region F by computing the gross rock volume (GRV) of region A, similar to Equation 4. Any suitable algorithm (e.g., Turning Band Simulation, Sequential Gaussian Simulation, etc.) may be used to estimate a porosity distribution "por" inside of region A at n sampled locations. A net-to-gross may be determined as the ratio of the volume of hydrocarbon-bearing rock (for example, region A) to the gross rock volume (GRV) of the entire subsurface region F. Similar to Equation 15 above, an average porosity value may be multiplied by the average net-to-gross value at n locations to yield the following formula for Net Pore Volume of any region A within subsurface region F:

$$NPV = \overline{net*por} * |\hat{A}| \qquad \text{Eq. (16)}$$

where the net pore volume (NPV) describes the pore volume within region A, regardless of which fluid occupies the pores.

The NPV of any sub-region A within the subsurface region with an uncertainty of the oil-water contact (OWC) may also be determined with the grid-less approach. In a subsurface region such as a hydrocarbon reservoir, various fluids may comprise differing densities. The various fluids may be immiscible and form a distinct line of contact in the reservoir—for oil and water, this is the OWC. The OWC may be uncertain, and therefore a distribution may be created to estimate a depth of the OWC in the sub-region A. A GRV of the sub-region A above the OWC may then be computed; as oil is less dense than water, the GRV above the OWC may represent a gross rock volume comprising primarily hydrocarbons. Thus, this GRV may be input into Equation 16 to calculate the NPV of the sub-region A above the OWC saturated with hydrocarbons.

Figure 2:
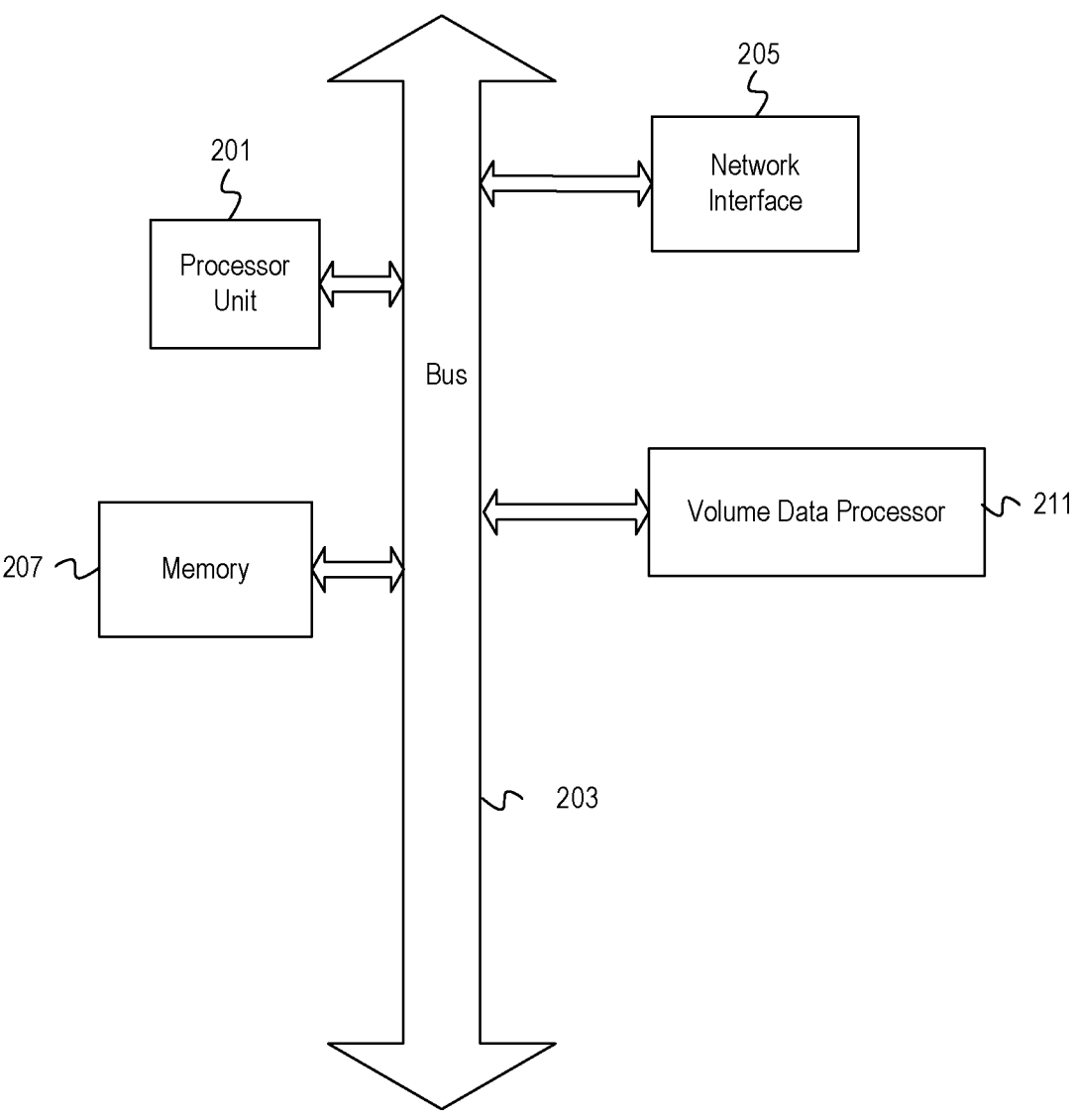
FIG. 2 depicts an example computer, according to some embodiments.

FIG. 2 depicts an example computer system, according to some embodiments. The computer system may include a processor 201 (possibly including multiple processors, multiple cores, multiple nodes, and/or implementing multi- $$OOIP = \overline{net*por*(1-sw)} * |\hat{A}| \approx \overline{net*por*(1-sw)} * |\hat{A}| \qquad \text{Eq. (15)}$$

$$= \overline{net*por*(1-sw)} * \frac{\text{number of sampled points in } A}{\text{total number of sampled points } n} * |B|$$

threading, etc.). The computer system may include memory 207. The memory 207 may be system memory or any one or more of the above already described possible realizations of machine-readable media. The computer system may also include a bus 203 and a network interface 205. The system may communicate via transmissions to and/or from remote devices via the network interface 205 in accordance with a network protocol corresponding to the type of network interface, whether wired or wireless and depending upon the carrying medium. In addition, a communication or transmission may involve other layers of a communication protocol and or communication protocol suites (e.g., transmission control protocol, Internet Protocol, user datagram protocol, virtual private network protocols, etc.). The system also includes a volume data processor 211. The volume data processor 211 may simulate various properties, calculate a GRV of a subsurface region, and perform any of the above-described computations. Any one of the previously described functionalities may be partially (or entirely) implemented in hardware and/or on the processor 201. For example, the functionality may be implemented with an application specific integrated circuit, in logic implemented in the processor 201, in a co-processor on a peripheral device or card, etc. Further, realizations may include fewer or additional components not illustrated in FIG. 2 (e.g., video cards, audio cards, additional network interfaces, peripheral devices, etc.). The processor 201 and the network interface 205 are coupled to the bus 203. Although illustrated as being coupled to the bus 203, the memory 207 may be coupled to the processor 201.

Figure 3:
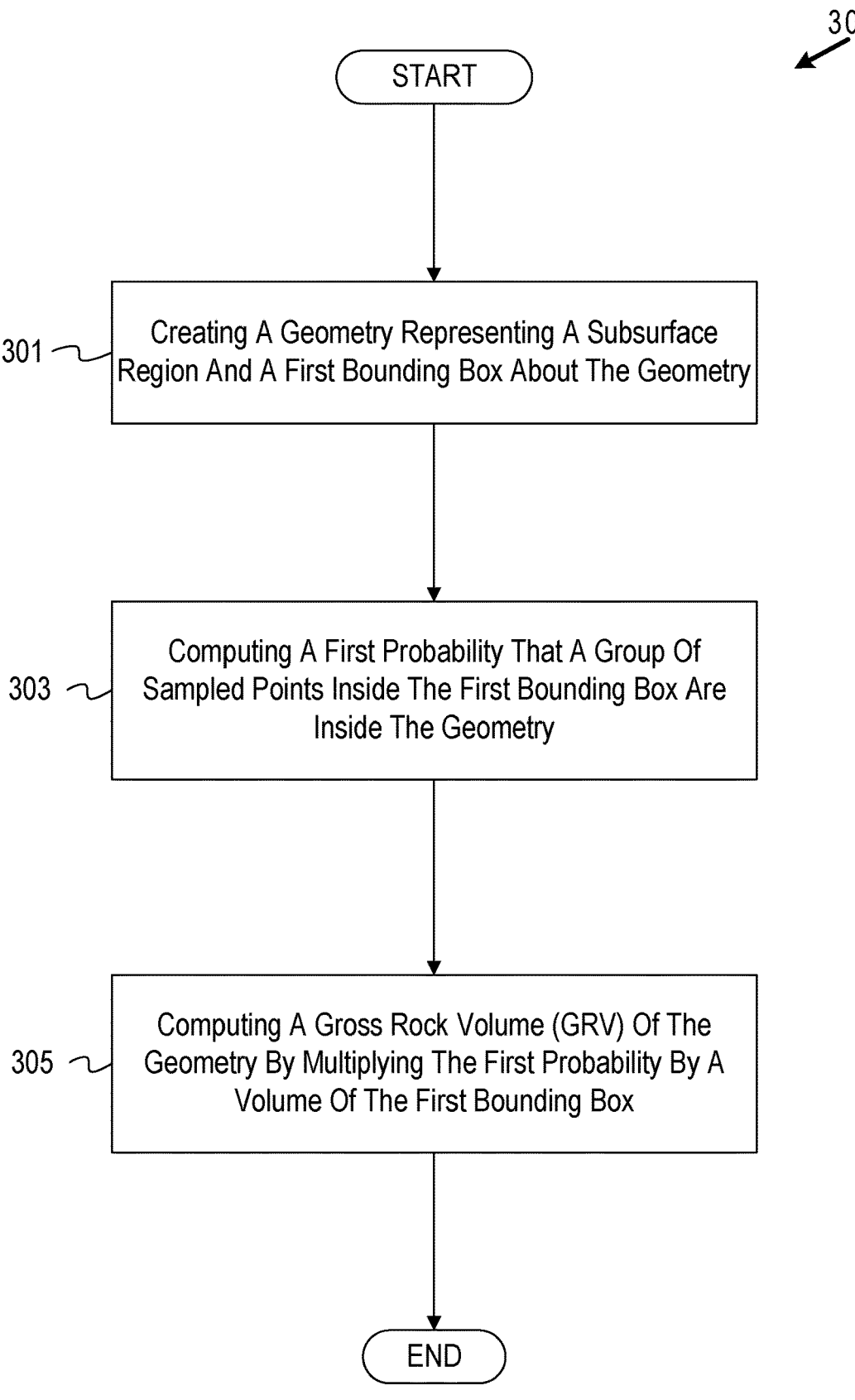
FIG. 3 depicts a flowchart of example operations, according to some embodiments.

The volume data processor 211 may perform any of the operations described here. For example, the volume data processor 211 may perform operations for calculating subsurface region volumetrics without a grid. FIG. 3 depicts a flowchart of example operations, according to some embodiments. Operations of a flowchart 300 may be performed by software, firmware, hardware, or a combination thereof (such as the volume data processor 211). Such operations are described with reference to FIGS. 1-2. However, such operations may be performed by other systems or components. For example, some of the operations may be performed by a computer within or external to the described volume data processor. The operations of the flowchart 300 begin at block 301.

At block 301, the volume data processor 211 creates a geometry representing a subsurface region and a first bounding box about the geometry, according to some embodiments. The bounding box 101 of FIG. 1 may be created through simple computations and may encompass a subsurface region 103. Flow progresses to block 303.

At block 303, the volume data processor 211 computes a first probability that a group of sample points inside the first bounding box are inside the geometry. In some embodiments, the first probability may be computed using Equation 2. Flow progresses to block 305.

As block 305, the volume data processor 211 computes a gross rock volume (GRV) of the geometry is calculated by multiplying the first probability by a volume of the first bounding box. In some embodiments, the GRV of the geometry may be calculated using Equation 4. Flow of flowchart 300 ceases.

Figure 4:
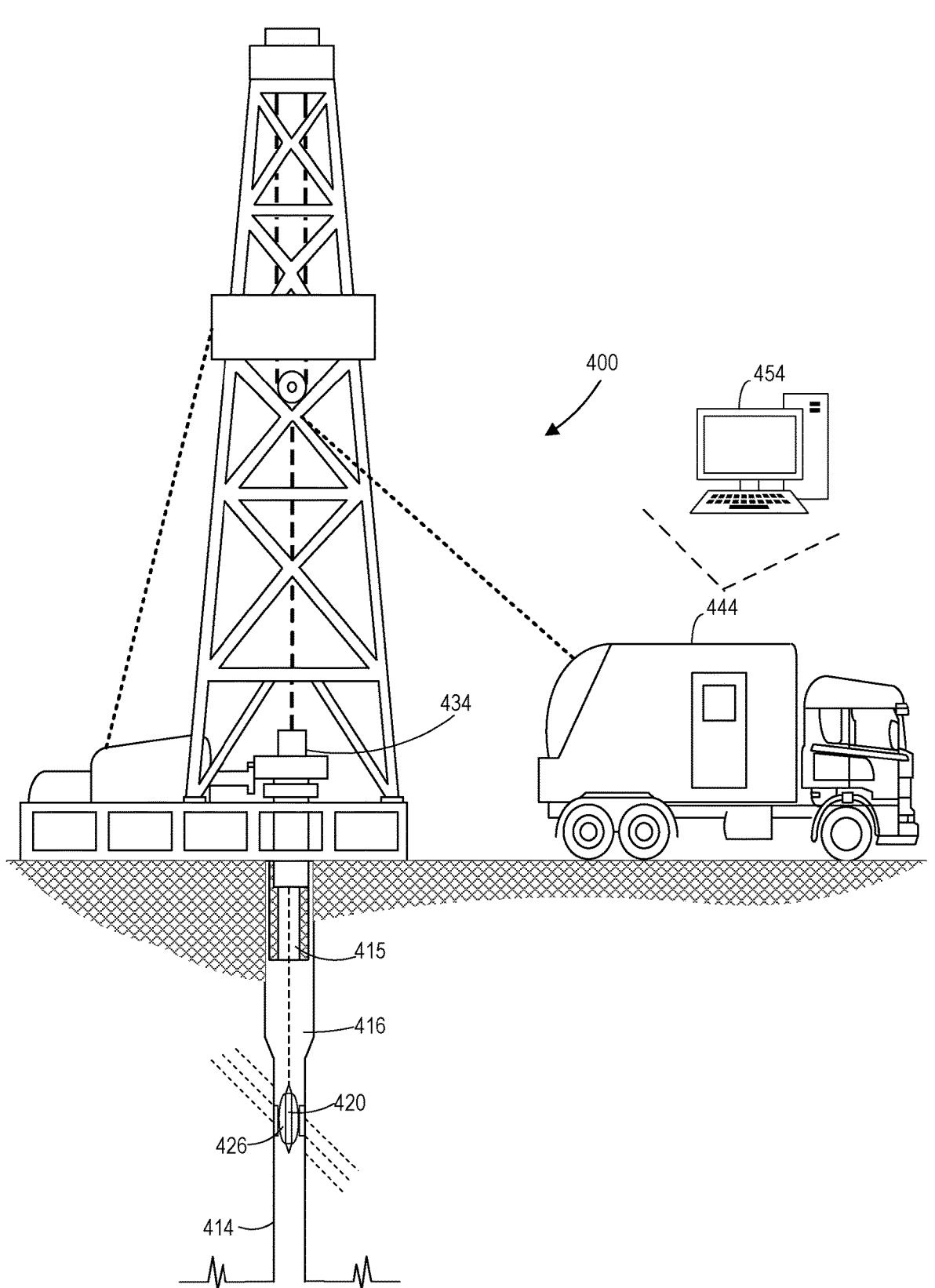
FIG. 4 depicts a schematic diagram of a wireline system with a volume data processor that implements distributed computing, according to some embodiments.

FIG. 4 depicts a schematic diagram of a wireline system with a volume data processor that implements distributed computing. In some embodiments, computer system 454 may include the volume data processor 211. A system 400 may be used in an illustrative logging environment with a drill string removed, in accordance with some embodiments of the present disclosure.

Subterranean operations may be conducted using a wireline system 420 once the drill string has been removed, though, at times, some or all of the drill string may remain in a borehole 414 during logging with the wireline system 420. The wireline system 420 may include one or more logging tools 426 that may be suspended in the borehole 414 by a conveyance 416 (e.g., a cable, slickline, or coiled tubing). The logging tool 426 may be communicatively coupled to the conveyance 415. The conveyance 415 may contain conductors for transporting power to the wireline system 420 and telemetry from the logging tool 426 to a logging facility 444. The logging facility 444 comprises the computer system 454 capable of computing volumetrics as described herein (e.g., with respect to FIGS. 1-3). Alternatively, the conveyance 415 may lack a conductor, as is often the case using slickline or coiled tubing, and the wireline system 420 may contain a control unit 434 that contains memory, one or more batteries, and/or one or more processors for performing operations and storing measurements.

In certain embodiments, the control unit 434 may be positioned at the surface, in the borehole (e.g., in the conveyance 415 and/or as part of the logging tool 426) or both (e.g., a portion of the processing may occur downhole and a portion may occur at the surface). The control unit 434 may include a control system or a control algorithm. In certain embodiments, a control system, an algorithm, or a set of machine-readable instructions may cause the control unit 434 to generate and provide an input signal to one or more elements of the logging tool 426, such as the sensors along the logging tool 426. The input signal may cause the sensors to be active or to output signals indicative of sensed properties. The logging facility 444 (shown in FIG. 4 as a truck, although it may be any other structure) may collect measurements from the logging tool 426, and may include computing facilities for controlling, processing, or storing the measurements gathered by the logging tool 426. The computing facilities may be communicatively coupled to the logging tool 426 by way of the conveyance 415 and may operate similarly to the control unit 434. In certain example embodiments, the control unit 434, which may be located in logging tool 426, may perform one or more functions of the computing facility.

The logging tool 426 includes a mandrel and a number of extendible arms coupled to the mandrel. One or more pads are coupled to each of the extendible arms. Each of the pads may have a surface facing radially outward from the mandrel. Additionally, at least a sensor is disposed on the surface of each pad. During operation, the extendible arms are extended outwards to a wall of the borehole to extend the surface of the pads outward against the wall of the borehole. The sensors of the pads of each extendible arm may detect image data to create captured images of the formation surrounding the borehole.

Figure 5:
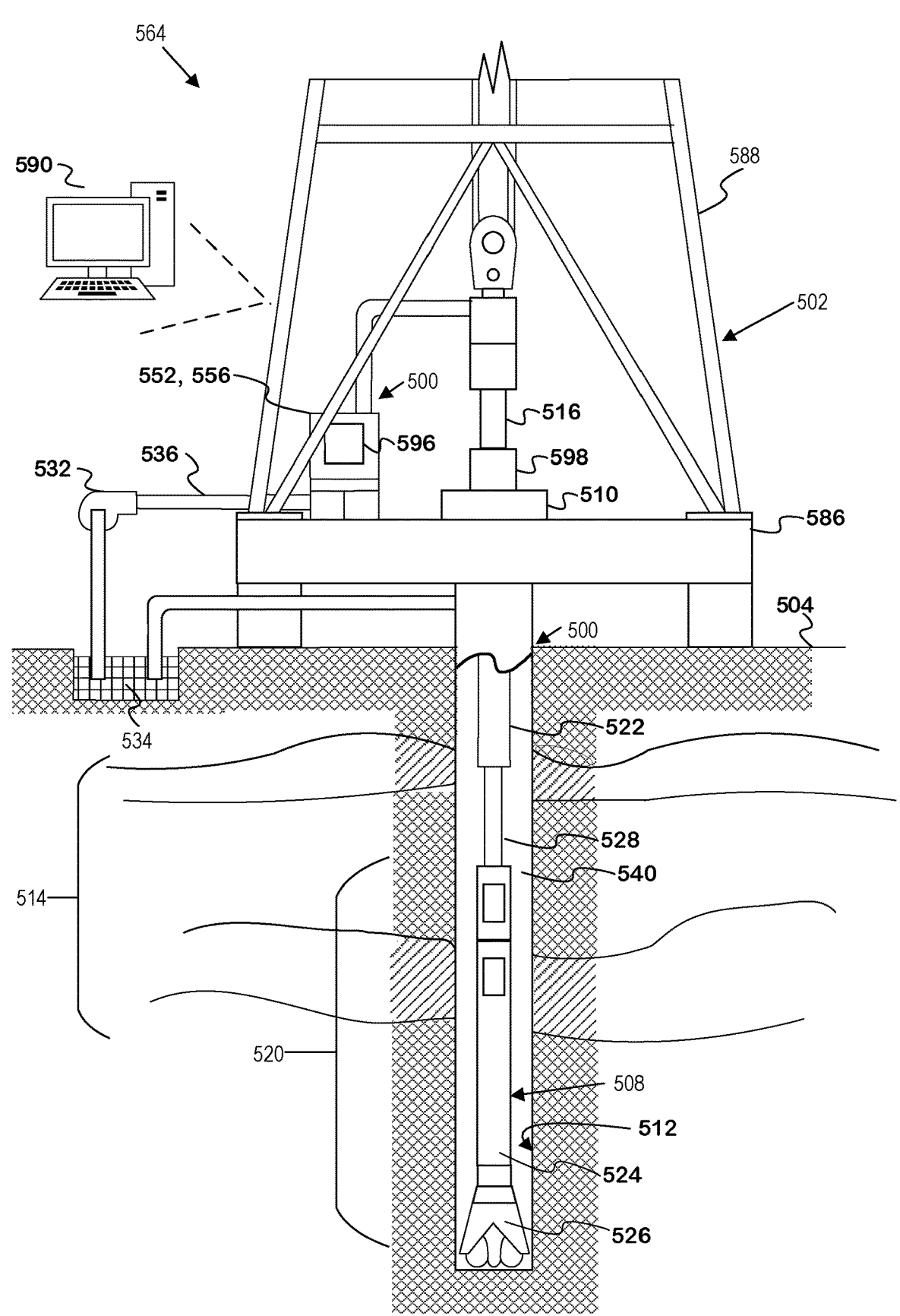
FIG. 5 depicts a schematic diagram of a drilling rig system with the volume data processor that implements distributed computing, according to some embodiments.

FIG. 5 is a schematic diagram of a drilling rig system with the volume data processor that implements distributed computing, according to some embodiments. For example, in FIG. 5 it may be seen how a system 564 may also form a portion of a drilling rig 502 located at the surface 504 of a well 506. Drilling of oil and gas wells is commonly carried out using a string of drill pipes connected together so as to form a drilling string 508 that is lowered through a rotary table 510 into a wellbore or borehole 512. Here a drilling platform 586 is equipped with a derrick 588 that supports a hoist. A volume data processor 590 (similar to the volume data processor 211) may be communicatively coupled to any measurements devices attached to the system 564 and may achieve parallelism in simulations as described above.

The drilling rig 502 may thus provide support for the drill string 508. The drill string 508 may operate to penetrate the rotary table 510 for drilling the borehole 512 through subsurface formations 514. The drill string 508 may include a kelly 516, drill pipe 518, and a bottom hole assembly 520, perhaps located at the lower portion of the drill pipe 518.

The bottom hole assembly 520 may include drill collars 522, a down hole tool 524, and a drill bit 526. The drill bit 526 may operate to create a borehole 512 by penetrating the surface 504 and subsurface formations 514. The down hole tool 524 may comprise any of a number of different types of tools including MWD tools, LWD tools, and others.

During drilling operations, the drill string 508 (perhaps including the kelly 516, the drill pipe 518, and the bottom hole assembly 520) may be rotated by the rotary table 510. In addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 514.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid may flow out from the drill bit 526 and be returned to the surface 504 through an annular area 540 between the drill pipe 518 and the sides of the borehole 512. The drilling fluid may then be returned to the mud pit 534, where such fluid is filtered. In some embodiments, the drilling fluid may be used to cool the drill bit 526, as well as to provide lubrication for the drill bit 526 during drilling operations. Additionally, the drilling fluid may be used to remove subsurface formation 514 cuttings created by operating the drill bit 526.

In some embodiments, data collected from the above systems 400 and 564 may be incorporated into the computer system 454 and volume data processor 590. Computations, such as any of the volumetrics described herein, may be completed by the computer system 454 and the volume data processor 590 and may be used to optimize or change operational parameters of the systems 400, 564. For example, a wireline operation may be performed by the wireline system 420 to evaluate a subsurface formation based, at least in part, on volumetrics computed by the volume data processor 590.

In some implementations, to find a GRV of any subregion A (also referred to as geometry A), a volume data processor (or other computing device or system) may: create a bounding box B around A, compute the volume of B, say |B|, randomly select n points inside B, and count how many of the above points inside A (say in points). The estimated volume |A| of A is computed as: |A|=|B|*m/n.

In some implementations, to compute a Net Pore Volume (NPV) of any sub region A of a reservoir, a volume data processor (or other computing device or system) may: compute the GRV |A| of A as above, use any algorithm such as Turning Band simulation or Sequential Gaussian Simulation to estimate a porosity distribution "por" inside geometry A at the sampled n locations, compute a "net-to-gross" at those n locations, compute the average of porosity values times the net-to-gross values at those n locations, and compute the NPV (NPV=volume of A*average of (porosity*net-to-gross)) at those n locations.

In some embodiments, to compute an Original Oil In Place (OOIP) of any sub region A of a reservoir, a volume data processor (or other computing device or system) may: compute the GRV |A| of A as above, use any algorithm such as Turning Band simulation or Sequential Gaussian Simulation to estimate a porosity distribution "por" inside region A at the sampled n locations, compute a "net-to-gross" at those n locations, compute the water saturation (sw) at those n locations, compute the average of porosity values times the net-to-gross values times (1−sw) at those n locations, and compute the OOIP (OOIP=volume of A*average of (porosity*net-to-gross*(1−sw))) at those n locations.

In some embodiments, to compute a Net Pore Volume (NPV) of any sub region A of a reservoir with an uncertain of Oil-Water Contact (OWC), a volume data processor (or other computing device or system) may: obtain an estimated OWC from an OWC distribution/uncertainty, compute the GRV of the regions inside A but above the OWC, use any algorithm such as Turning Band simulation or Sequential Gaussian Simulation to estimate the porosity distribution "por" inside region A at the sampled n locations above the OWC, compute the "net-to-gross" at those n locations inside A but above the OWC, compute the average of porosity values times the net-to-gross values at those n locations, and calculate the NPV (NPV=GRV*the average of (porosity*net-to-gross)) at those n locations.

Any of the methods for 3D volumes described herein may be adapted to provide any grid-less estimate of 2D areas (such as vertical or horizontal cross-section of the Earth's subsurface) and any non-discretized estimate of 1D thicknesses (such as thickness of a vertical column of the Earth's subsurface). In particular, the non-discretized estimates of 1D thicknesses may provide 2D thickness maps as well as 2D pore height maps, 2D net pore height maps, and 2D hydrocarbon column height maps.

While the aspects of the disclosure are described with reference to various implementations and exploitations, it will be understood that these aspects are illustrative and that the scope of the claims is not limited to them. In general, techniques for volumetric evaluations of a subsurface region as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" may be infringed with only one of the listed items, multiple of the listed items, and one or more of the items in the list and another item not listed.

EXAMPLE EMBODIMENTS

Embodiment 1: A method for computing, by a volume data processor, volumetrics of a subsurface region without gridlines associated with the subsurface region, comprising: creating, in the volume data processor, a geometry representing the subsurface region and first bounding box about the geometry; computing a first probability that a group of sampled points inside the first bounding box are inside the geometry; and computing a gross rock volume (GRV) of the geometry by multiplying the first probability by a volume of the first bounding box.

Embodiment 2: The method of Embodiment 1 further comprising: determining a quantity of points in the group of sampled points that will satisfy a precision based on a confidence level and the first probability.

Embodiment 3: The method of any one of Embodiments 1-2, further comprising: creating, in the volume data processor, a second geometry representing a subregion of the subsurface region and second bounding box about the second geometry; computing a second probability that a group of sampled points inside the second bounding box are also inside the second geometry; and computing a subregion GRV by multiplying the second probability by a volume of the second bounding box.

Embodiment 4: The method of Embodiment 3 further comprising: computing a pore volume of the subsurface region by multiplying the GRV by an average porosity of the geometry.

Embodiment 5: The method of Embodiment 4 further comprising: computing the average porosity of the geometry via Turning Band simulation or a Sequential Gaussian simulation.

Embodiment 6: The method of any one of Embodiments 4-5 further comprising: computing a net pore volume (NPV) of the subregion by multiplying the subregion GRV by an average porosity of the subregion and by an average net-to-gross function value for the subregion.

Embodiment 7: The method of any one of Embodiments 4-6 further comprising: computing an original oil in place (OOIP) of the subregion by multiplying the second probability by the volume of the second bounding box; and multiplying an average porosity of the subregion by an average net-to-gross function value for the subregion and by a hydrocarbon saturation of the subregion.

Embodiment 8: A volume data processor comprising program code configured to compute volumetrics of a subsurface region without gridlines associated with the subsurface region, the program code executable on one or more processors, the program code comprising: instructions to create, in the volume data processor, a geometry representing the subsurface region and first bounding box about the geometry; instructions to compute a first probability that a group of sampled points inside the first bounding box are inside the geometry; and instructions to compute a gross rock volume (GRV) of the geometry by multiplying the first probability by a volume of the first bounding box.

Embodiment 9: The volume data processor of Embodiment 8 further comprising: instructions to create, in the volume data processor, a second geometry representing a subregion of the subsurface region and second bounding box about the second geometry; instructions to compute a second probability that a group of sampled points inside the second bounding box are also inside the second geometry; and instructions to compute a subregion GRV by multiplying the second probability by a volume of the second bounding box.

Embodiment 10: The volume data processor of Embodiment 9 further comprising: instructions to compute a pore volume of the subsurface region by multiplying the GRV by an average porosity of the geometry.

Embodiment 11: The volume data processor of Embodiment 10 further comprising: instructions to compute the average porosity of the geometry via Turning Band simulation or a Sequential Gaussian simulation.

Embodiment 12: The volume data processor of any one of Embodiments 10-11 further comprising: instructions to compute a net pore volume (NPV) of the subregion by multiplying the subregion GRV by an average porosity of the subregion and by an average net-to-gross function value for the subregion.

Embodiment 13: The volume data processor of any one of Embodiments 10-12 further comprising: instructions to compute an original oil in place (OOIP) of the subregion by multiplying the second probability by the volume of the second bounding box; and instructions to multiply an average porosity of the subregion by an average net-to-gross function value for the subregion and by a hydrocarbon saturation of the subregion.

Embodiment 14: One or more non-transitory, machine-readable media including program code configured to compute volumetrics of a subsurface region without gridlines associated with the subsurface region, the program code executable by a volume data processor, the program code comprising: instructions to create, in the volume data processor, a geometry representing the subsurface region and first bounding box about the geometry; instructions to compute a first probability that a group of sampled points inside the first bounding box are inside the geometry; and instructions to compute a gross rock volume (GRV) of the geometry by multiplying the first probability by a volume of the first bounding box.

Embodiment 15: The machine-readable media of Embodiment 14 further comprising: instructions to create, in the volume data processor, a second geometry representing a subregion of the subsurface region and second bounding box about the second geometry; instructions to compute a second probability that a group of sampled points inside the second bounding box are also inside the second geometry; and instructions to compute a subregion GRV by multiplying the second probability by a volume of the second bounding box.

Embodiment 16: The machine-readable media of Embodiment 15 further comprising: instructions to compute a pore volume of the subsurface region by multiplying the GRV by an average porosity of the geometry.

Embodiment 17: The machine-readable media of Embodiment 16 further comprising: instructions to compute the average porosity of the geometry via Turning Band simulation or a Sequential Gaussian simulation.

Embodiment 18: The machine-readable media of any one of Embodiments 16-17 further comprising: instructions to compute a net pore volume (NPV) of the subregion by multiplying the subregion GRV by an average porosity of the subregion and by an average net-to-gross function value for the subregion.

Embodiment 19: The machine-readable media of any one of Embodiments 16-18 further comprising: instructions to compute an original oil in place (OOIP) of the subregion by multiplying the second probability by the volume of the second bounding box; and instructions to multiply an average porosity of the subregion by an average net-to-gross function value for the subregion and by a hydrocarbon saturation of the subregion.

Embodiment 20: The machine-readable media of any one of Embodiments 14-19 further comprising: instructions to determine a quantity of points in the group of sampled points that will satisfy a precision based on a confidence level and the first probability.

What is claimed is:

1. A method for computing, by a volume data processor, volumetrics of a subsurface region without gridlines associated with the subsurface region, comprising:

creating, in the volume data processor, a geometry representing the subsurface region and a first bounding box about the geometry;

computing a first probability that a group of sampled points inside the first bounding box are inside the geometry; and computing a gross rock volume (GRV) of the geometry by multiplying the first probability by a volume of the first bounding box.

2. The method of claim 1 further comprising:

determining a quantity of points in the group of sampled points that will satisfy a precision based on a confidence level and the first probability.

3. The method of claim 1, further comprising:

creating, in the volume data processor, a second geometry representing a subregion of the subsurface region and second bounding box about the second geometry;

computing a second probability that a group of sampled points inside the second bounding box are also inside the second geometry; and computing a subregion GRV by multiplying the second probability by a volume of the second bounding box.

4. The method of claim 3 further comprising:

computing a pore volume of the subsurface region by multiplying the GRV by an average porosity of the geometry.

5. The method of claim 4 further comprising:

computing the average porosity of the geometry via Turning Band simulation or a Sequential Gaussian simulation.

6. The method of claim 4 further comprising:

computing a net pore volume (NPV) of the subregion by multiplying the subregion GRV by an average porosity of the subregion and by an average net-to-gross function value for the subregion.

7. The method of claim 4 further comprising:

computing an original oil in place (OOIP) of the subregion by multiplying the second probability by the volume of the second bounding box; and multiplying an average porosity of the subregion by an average net-to-gross function value for the subregion and by a hydrocarbon saturation of the subregion.

8. A volume data processor comprising program code configured to compute volumetrics of a subsurface region without gridlines associated with the subsurface region, the program code executable on one or more processors, the program code comprising:

instructions to create, in the volume data processor, a geometry representing the subsurface region and a first bounding box about the geometry;

instructions to compute a first probability that a group of sampled points inside the first bounding box are inside the geometry; and instructions to compute a gross rock volume (GRV) of the geometry by multiplying the first probability by a volume of the first bounding box.

9. The volume data processor of claim 8 further comprising:

instructions to create, in the volume data processor, a second geometry representing a subregion of the subsurface region and second bounding box about the second geometry;

instructions to compute a second probability that a group of sampled points inside the second bounding box are also inside the second geometry; and instructions to compute a subregion GRV by multiplying the second probability by a volume of the second bounding box.

10. The volume data processor of claim 9 further comprising:

instructions to compute a pore volume of the subsurface region by multiplying the GRV by an average porosity of the geometry.

11. The volume data processor of claim 10 further comprising:

instructions to compute the average porosity of the geometry via Turning Band simulation or a Sequential Gaussian simulation.

12. The volume data processor of claim 10 further comprising:

instructions to compute a net pore volume (NPV) of the subregion by multiplying the subregion GRV by an average porosity of the subregion and by an average net-to-gross function value for the subregion.

13. The volume data processor of claim 10 further comprising:

instructions to compute an original oil in place (OOIP) of the subregion by multiplying the second probability by the volume of the second bounding box; and instructions to multiply an average porosity of the subregion by an average net-to-gross function value for the subregion and by a hydrocarbon saturation of the subregion.

14. One or more non-transitory, machine-readable media including program code configured to compute volumetrics of a subsurface region without gridlines associated with the subsurface region, the program code executable by a volume data processor, the program code comprising:

instructions to create, in the volume data processor, a geometry representing the subsurface region and a first bounding box about the geometry;

instructions to compute a first probability that a group of sampled points inside the first bounding box are inside the geometry; and instructions to compute a gross rock volume (GRV) of the geometry by multiplying the first probability by a volume of the first bounding box.

15. The machine-readable media of claim 14 further comprising:

instructions to create, in the volume data processor, a second geometry representing a subregion of the subsurface region and second bounding box about the second geometry;

instructions to compute a second probability that a group of sampled points inside the second bounding box are also inside the second geometry; and instructions to compute a subregion GRV by multiplying the second probability by a volume of the second bounding box.

16. The machine-readable media of claim 15 further comprising:

instructions to compute a pore volume of the subsurface region by multiplying the GRV by an average porosity of the geometry.

17. The machine-readable media of claim 16 further comprising:

instructions to compute the average porosity of the geometry via Turning Band simulation or a Sequential Gaussian simulation.

18. The machine-readable media of claim 16 further comprising:

instructions to compute a net pore volume (NPV) of the subregion by multiplying the subregion GRV by an average porosity of the subregion and by an average net-to-gross function value for the subregion.

19. The machine-readable media of claim 16 further comprising:

instructions to compute an original oil in place (OOIP) of the subregion by multiplying the second probability by the volume of the second bounding box; and instructions to multiply an average porosity of the subregion by an average net-to-gross function value for the subregion and by a hydrocarbon saturation of the subregion.

20. The machine-readable media of claim 14 further comprising:

instructions to determine a quantity of points in the group of sampled points that will satisfy a precision based on a confidence level and the first probability.

\* \* \* \* \*